March 22, 1960 S. J. KAMINSKY Re. 24,801

TOOL FOR WELDING THERMO-PLASTIC MATERIALS

Original Filed Feb. 18, 1957 2 Sheets-Sheet 1

Inventor:
Stanley J. Kaminsky,
By Porter, Chittick & Russell
Attorneys

TOOL FOR WELDING THERMO-PLASTIC MATERIALS

Original Filed Feb. 18, 1957 2 Sheets-Sheet 2

Inventor:
Stanley J. Kaminsky,
by Porter Chittick & Russell
Attorneys

United States Patent Office

Re. 24,801
Reissued Mar. 22, 1960

24,801

TOOL FOR WELDING THERMO-PLASTIC MATERIALS

Stanley J. Kaminsky, Norwood, Mass.

Original No. 2,862,543, dated December 2, 1958, Serial No. 640,916, February 18, 1957. Application for reissue November 18, 1959, Serial No. 853,987

8 Claims. (Cl. 154—42)

Matter enclosed in heavy brackets [ ] appears in the original patent but forms no part of this reissue specification; matter printed in italics indicates the additions made by reissue.

This invention relates to the plastic industry and is particularly concerned with the provision of a new and novel tool designed to facilitate the welding together of two pieces of thermo-plastic material.

The art of welding thermo-plastic materials together is well known and an early application of the method in its broad aspect is shown in the patent to Reinhardt, 2,220,545. An early form of tool that has been utilized in carrying out the process is shown in the patent to Phillips, 2,372,737, but while the principles of welding thermo-plastic materials together are understood nevertheless there has been little advance in the speed of carrying out the welding operation and this is due in large part to the inadequacy of the welding tools that have been available to this industry. The slowness of the welding operation which involves manual manipulation of the available tool has resulted in high costs per foot of welding and accordingly the use of plastic materials in certain applications is less attractive than it might be if costs were lower.

Through the use of the tool which I have invented it is now posisble to carry out the welding operation at a linear rate three to four times as fast as has heretofore been possible with present day equipment. The tool is semi-automatic in operation and combines in a single instrument mechanism enabling adequate heat in the form of a gas blast to be applied to the materials to be welded at [a point] *an area closely* in advance of the actual welding location thereby to pre-heat and condition the thermo-plastic material to thereafter receive the filler material which is being simultaneously heated as it passes through the tool. The initial heating of the filler material brings it to a flexible state after which it is additionally heated to the proper temperature at the welding position to produce perfect conditions for successful bonding of the filler material to the abutting or adjacent pieces of the base thermo-plastic material that are to be joined together.

The invention contemplates a structure in the form of a hand moved and directed tool with means adapted to receive a high temperature gas, generally air, from a suitable source and with means to direct this heated gas simultaneously to two different areas, one area being in advance of the weld and the other area at the point of weld. By this construction the base material to be welded is properly pre-heated at the correct area so that when the tool is advanced to deliver the filler material to the weld position conditions have been developed in both the base and filler materials which make it possible for the filler material to be laid properly in welding position at a far higher rate of speed than heretofore possible.

The tool also includes a guide tube through which the filler material, usually in the form of a rod of indeterminate length, passes on its way to the welding position. Means is provided whereby some of the heat from the hot air is transmitted to the guide tube, thereby to heat the filler material as it passes through the guide tube permitting it to bend properly as it is fed into the welding position. Additionally, there is provided a pressing and guiding element which directs the tool along the line of the weld and at the same time permits the operator to apply the required pressure to the filler material to produce the proper bond with the base materials that are to be welded.

These and other objects of the invention will become more apparent as the description proceeds with the aid of the accompanying drawings in which Fig. 1 is a perspective view showing the position of the tool in use as it lays and presses the filler material in the space between the base materials that are being welded.

Fig. 7 shows still another type of weld in which the base materials to be welded are of considerable thickness and require the welding in of a plurality of strips of filler material to build up and complete the weld therebetween.

Figure 1:
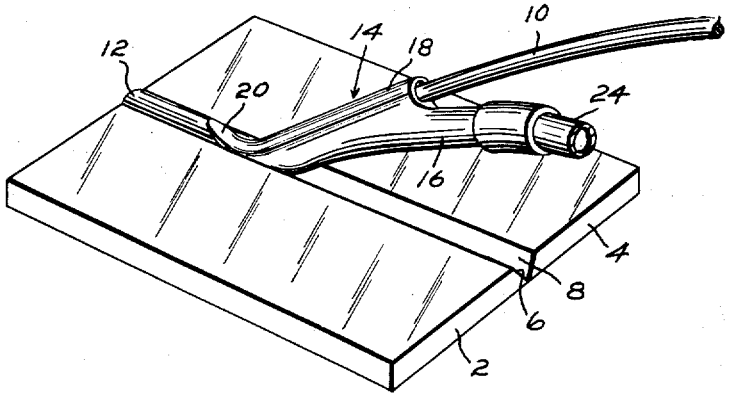

Referring to Fig. 1, the two pieces of thermo-plastic base material that are to be welded are indicated at 2 and 4. Their adjacent surfaces 6 and 8 are cut at an angle so as to provide a V-shaped space therebetween into which the filler material is deposited.

The filler material is shown in rod form at 10 as it enters the welding tool and at 12 in its deposited form where is has completed the weld between the base materials 2 and 4.

The welding tool itself is referred to generally at 14 and it is comprised of a hot air tube 16, a guide tube 18 and a pressing and guiding element or shoe 20. The hot air tube 16 has at its upper end a threaded connection 22 by which it may be joined by suitable piping 24 to a source of hot gas under adequate pressure. This gas will reach the hot air tube 16 at a temperature in the vicinity of 500 degrees F. Suitable sources of hot air for use in this connection are known to the industry and do not need to be disclosed in this application as such sources constitute no part of the present invention.

Figure 2:
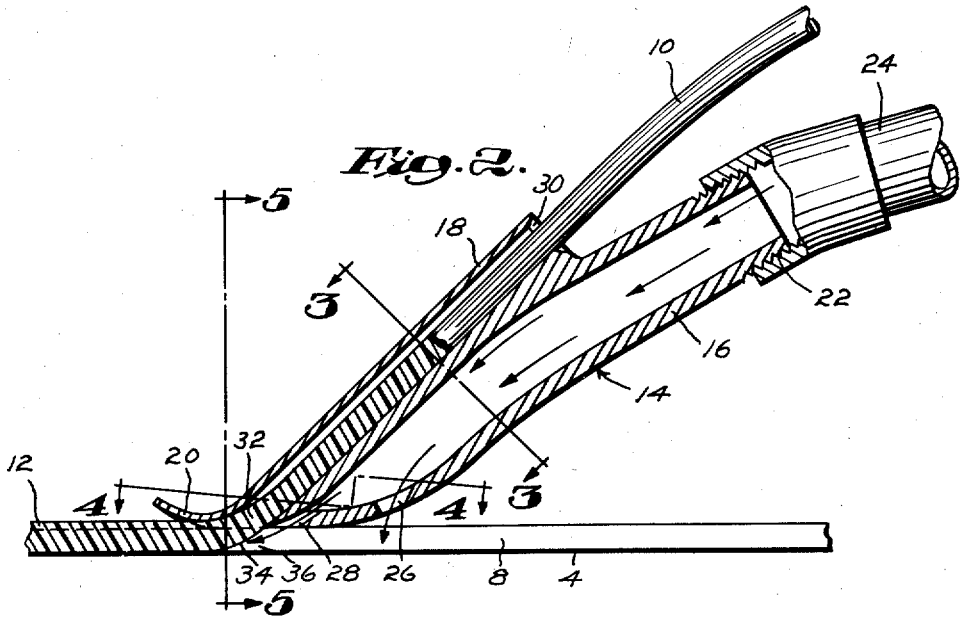
Fig. 2 is a vertical sectional view of the tool in use showing the means for directing the hot air to two separate areas with the guiding and pressing element acting on the filler material to produce a proper weld.

At the lower end of the hot air tube are two ports 26 and 28 which are so located and constructed as to serve particular and important purposes. The port 26 directs the high temperature air at the side walls 6 and 8 at positions in advance of the welding point. The hot air, because of the [size] *lateral dimension* of the port 26, is well confined in the V-space whereby the surface temperatures of the walls 6 and 8 are brought up to a degree closely approximating that for proper welding conditions. *Port 26 is of such length and so closely adjacent port 28 that the sides 6 and 8 will have their temperatures continuously raised under the influence of hot air issuing simultaneously from ports 26 and 28 to merge in the V-shaped area leading to the welding point.* In any event, the base materials are pre-heated [in a localized area] on the walls 6 and 8 so that as the tool is advanced to the right as viewed in Figs. 1 and 2 the walls 6 and 8 will be ready to receive the filler material 10 as all parts are finally heated to the proper welding temperature.

Thus is can be seen that the provision of the leading port 26 in advance of the welding point serves an important purpose in bringing the surfaces 6 and 8 to a preheated high temperature which, as will be more fully appreciated hereinafter, enables the tool to be drawn far more rapidly along the line of weld than has heretobefore been possible with tools having only a single hot air blast that is aimed directly at the welding position. Keeping the pre-heating air blast within the confines of the V-space helps to prevent damage to adjacent areas of the base materials.

Figure 3:
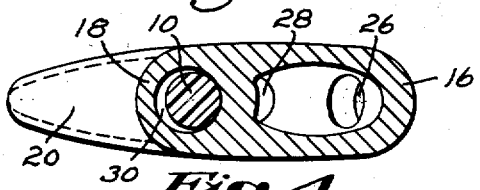
Fig. 3 is a section taken on the line 3—3 of Fig. 2.
Figure 4:
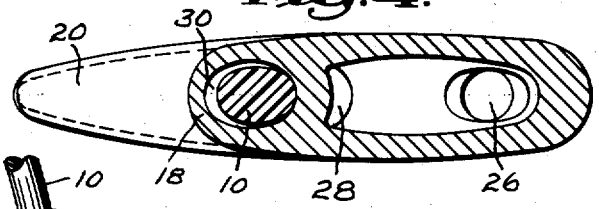
Fig. 4 is a section taken on the line 4—4 of Fig. 2.

The hot air tube 16 is connected directly with the guide tube 18 in such manner that some of the high temperature of the air is transmitted by conduction to the guide tube 18 in which the filler material 10 has been positioned initially. As can be seen in Fig. 3, the filler material 10, while not completely filling the guide tube opening 30, nevertheless is in sufficient contact with the wall so as to receive an adequate amount of heat to soften it so that it can bend readily as it leaves guide tube 18 at the position 32 and as it is about to be laid in the V between the base materials.

The second port 28 is so constructed *and located* that part of the hot air flowing through hot air tube 16 is directed to the underside 34 of the filler material and to both of the immediately adjacent areas of walls 6 and 8 so that the walls which have been pre-heated by the hot air passing through port 26 are now readily and quickly brought up to the correct welding temperature. In other words, while the tool is being continuously advanced, both the walls 6 and 8 at the position indicated at 36 in Fig. 2 and the underside 34 of filler material 10 are being progressively brought to the correct welding temperature [so that] *by the conjoint action of the hot air streams from ports 26 and 28, which streams continuously merge in the V-shaped area thereunder, to produce a rising temperature in the material as the filler material approaches the welding point. Thus* the tool 14 may be rapidly drawn along the line of the weld with the filler material automatically being laid in place and welded as indicated at 12.

Figure 5:
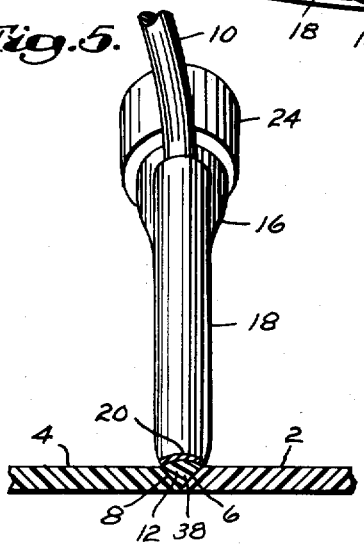
Fig. 5 is an elevation taken on the line 5—5 of Fig. 2.

In order that a proper bond may immediately be developed between the filler material and the walls 6 and 8, a pressing and guiding element in the form of a gently curved shoe concave on its underside extends from the lower end of guide tube 18. This shoe is so designed to be of proper width to force the entire volume of filler material 10 into its new wedge shaped configuration as shown at 38 in Fig. 5.

Because the correct temperatures can be progressively created at the point of welding through the pre-heating and final heating steps, the tool 14 can be advanced far more rapidly than other tools of the prior art designed to achieve this result. That is to say, a weld through the use of my tool can be made, conservatively speaking, at the rate of 36 to 40 inches per minute as compared to current standards of perhaps 10 inches per minute.

Figure 6:
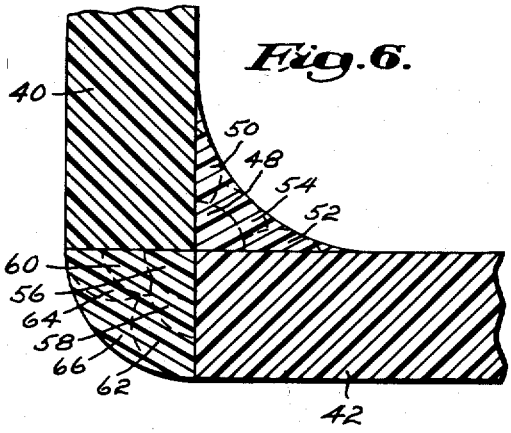
Fig. 6 illustrates another type of welding operation that the tool is capable of performing in which a succession of strips of filler material are applied.
Figure 8:
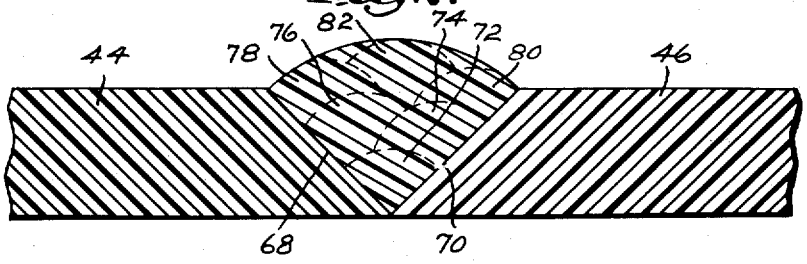

In the welding of relatively thick sheets of thermo-plastic material, such as illustrated in Figs. 6 and 7, the thick sheets being numbered 40, 42, 44 and 46, my tool may be used successfully to lay a plurality of strips of filler material, one on top of the other, until the weld is built up sufficiently to produce the required strength.

Referring to Fig. 6, the base materials 40 and 42 are held in correct adjoining 90 degree position and the strip 48 is laid in position through the use of tool 14 in the manner heretofore described. Thereafter strips 50, 52 and 54 are successively laid in position to complete the weld on this side. The filler material is applied to the other side in like manner by depositing successively filler strips 56, 58, 60, 62, 64 and 66.

A similar method may be utilized when the thick pieces of plastic 44 and 46 lie in the same plane. These will be beveled as at 68 and 70, after which the tool 14 is utilized in the manner aforesaid to apply successively filler strips 72, 74, 76, 78, 80 and 82. It will be understood, of course, that the filler strip itself is of thermo-plastic material so that each successive filler strip may be properly bonded to the upper surface of a previously laid in filler strip.

While the air tube 16 and the guide tube 18 have been shown in the drawings as if made from a single integral piece of material, it will be understood that the unit could be fabricated in any convenient way. For example, two separate tubes might be used which could be welded together along their contacting lengths. Likewise the lower end of air tube 16 may be closed in any convenient manner, but this is a simple matter of fabrication and details of constructional procedures which are so obvious do not need to be discussed herein in any further detail. It is important, however, that whatever means is used to connect air tube 16 to guide tube 18 is of such character that adequate heat will be transmitted to the guide tube to warm filler material 10 sufficiently so it can easily make the bend at 32 as it approaches welding position.

It will be appreciated further that once the filler material has been initially tacked to the sides of the base material the tool 14 may thereafter be drawn rapidly along the V-shaped notch without further regard to the feeding of filler material 10. That is to say, the material 10 feeds itself as the tool is advanced. The material is drawn downward through guide tube 18 and the underside which is immediately thereafter to be welded is heated automatically to correct temperature by the hot air passing through port 28. Material 10 is then laid and pressed properly into position by shoe 20 to be firmly bonded against the walls 6 and 8 which have been brought to the correct welding temperature at the same time that the underside of the filler material at area 34 has been brought to the same correct welding temperature.

It is my intention to cover all changes and modifications of the example of the invention herein chosen for purposes of the disclosure which do not constitute departures from the spirit and scope of the invention.

I claim:

1. A tool for welding thermo-plastic base materials together, said tool comprising a guide tube, a hot air tube for receiving hot air under pressure connected to said guide tube by means capable of transmitting heat from said hot air tube to said guide tube whereby filler material positioned within said guide tube may be heated, means at the lower end of said hot air tube for directing hot air to the surfaces of the base materials to be welded at a position ahead of the welding point for the purpose of pre-heating the welding surfaces of said base materials, other means at the lower end of said hot air tube for simultaneously directing hot air directly against the said base materials and the underside only of the filler material at the immediate area of contact about to be made between said base materials and filler material as the filler material feeds downwardly from said guide tube as the tool is advanced, and a pressing and guiding element associated with said guide tube and hot air tube, said element extending above and to the rear of the position of initial contact of the said base materials and filler material as the welding proceeds, said element acting as means for guiding the tool along the line of the weld and for applying the required pressure to the filling material to produce a satisfactory weld.

2. A tool as set forth in claim 1 in which the means connecting said guide tube and said hot air tube is in the form of a metallic weld.

3. A tool as set forth in claim 1 and in which the said pressing and guiding element is in cross-section concave downwardly.

4. A tool as set forth in claim 1 in which said pressing and guiding element extends from said guide tube at an obtuse angle.

5. A tool as set forth in claim 1, said guide tube and hot air tube being welded together, said pressing and guiding element being integral with and an extension of said guide tube and said pressing and guiding element extends to the rear of said guide tube at an obtuse angle thereto.

6. A tool for welding thermo-plastic material together, said tool comprising a cylindrical guide tube for receiving a cylindrical rod of filler material, a hot air tube for receiving hot air under pressure connected to said guide tube by heat conducting means, said hot air tube having a first port for directing hot air at limited areas of said materials in advance of the welding position and a second port for directing hot air directly at the welding surfaces of said materials and the underside of said filler material immediately prior the formation of the weld as the tool is advanced in the direction of said first port, and a shoe concave downwardly and rigid with respect to said guide tube for pressing said filler material against the welding faces of said thermoplastic materials, said first and second ports and said shoe being in longitudinal alignment.

*7. A tool for welding thermo-plastic base materials together, said tool comprising a guide tube, a hot air tube for receiving hot air under pressure connected to said guide tube by means capable of transmitting heat from said hot air tube to said guide tube whereby filler material positioned within said guide tube may be heated, means at the lower end of said hot air tube for directing hot air to the surfaces of the base materials to be welded at a position ahead of the welding point for the purpose of pre-heating the welding surfaces of said base materials and for simultaneously directing hot air against the said base materials and the underside only of the filler material at the immediate area of contact about to be made between said base materials and filler material as the filler material feeds downwardly from said guide tube as the tool is advanced, and a pressing and guiding element associated with said guide tube and hot air tube, said element extending above and to the rear of the position of initial contact of the said base materials and filler material as the welding proceeds, said element acting as means for guiding the tool along the line of the weld and for applying the required pressure to the filling material to produce a satisfactory weld.*

*8. A tool for welding thermo-plastic base materials together, said tool comprising a guide tube, a hot air tube for receiving hot air under pressure connected to said guide tube by means capable of transmitting heat from said hot air tube to said guide tube whereby filler material positioned within said guide tube may be heated, means at the lower end of said hot air tube for directing hot air to the underside only of the filler material and downwardly against the base materials along the line of the weld to be made for a distance sufficiently in advance of the welding point to cause, as the tool is advanced, a rapid and progressive increase in temperature of the base materials to bring both the filler material and the base materials to the required welding temperature at the point where the filler material is applied to the base materials and a pressing and guiding element associated with said guide tube and hot air tube, said element extending to the rear of the position of initial contact of the said base materials and filler materials as the welding proceeds, said element acting as means for guiding the tool along the line of the weld and for applying the required pressure to the filling material to produce a satisfactory weld.*

References Cited in the file of this patent or the original patent

UNITED STATES PATENTS

| | | |
|---|---|---|
| 1,141,932 | Byrnes | June 8, 1915 |
| 1,752,139 | Anderson | Mar. 25, 1930 |
| 2,265,359 | Neumann | Dec. 9, 1941 |
| 2,360,950 | Kilgour | Oct. 24, 1944 |
| 2,678,679 | Bergstein | May 18, 1954 |
| 2,722,964 | Duncan | Nov. 8, 1955 |